(12) United States Patent
Itahara et al.

(10) Patent No.: US 6,754,260 B1
(45) Date of Patent: Jun. 22, 2004

(54) DIGITAL MODULATION SIGNAL MEASURING DEVICE AND METHOD CAPABLE OF EVALUATING SPECTRUM OF NOISE COMPONENT

(75) Inventors: Hiroshi Itahara, Atsugi (JP); Yoshihide Gotou, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/719,605

(22) PCT Filed: May 9, 2000

(86) PCT No.: PCT/JP00/02954

§ 371 (c)(1),
(2), (4) Date: Dec. 12, 2000

(87) PCT Pub. No.: WO00/69136

PCT Pub. Date: Nov. 16, 2000

(30) Foreign Application Priority Data

May 10, 1999 (JP) .......................................... 11-128286

(51) Int. Cl.[7] .......................... H04B 17/00; H04B 3/46; H04Q 1/20
(52) U.S. Cl. ........................ 375/224; 375/329; 329/304
(58) Field of Search ................................ 375/224, 227, 375/285, 316, 346, 349, 350; 370/206, 210; 455/423, 67.1, 226.1, 67.7, 115; 324/76.19; 329/304

(56) References Cited

U.S. PATENT DOCUMENTS 5,799,038 A * 8/1998 Nowara et al. ............. 375/224
6,112,067 A * 8/2000 Seike et al. ............... 455/226.4
6,243,576 B1 * 6/2001 Seike et al. ................. 455/423
6,263,028 B1 * 7/2001 Nagano ....................... 375/329
6,552,995 B1 * 4/2003 Nakada ....................... 370/206

FOREIGN PATENT DOCUMENTS

| EP | 0748056 A2 | 12/1996 |
|----|------------|---------|
| EP | 0805573 A2 | 11/1997 |
| JP | 4-123639   | 4/1992  |

* cited by examiner

*Primary Examiner*—Jean B. Corrielus
(74) *Attorney, Agent, or Firm*—Frishauf, Holtz, Goodman & Chick, P.C.

(57) ABSTRACT

A digital modulation signal measuring device of the present invention is designed to generate a signal string of an ideal base band component after correcting frequency deviation of a base band component included in a digital modulation signal to be measured, detect a noise component included in the digital modulation signal based on this ideal base band component, and output (display) the spectrum of the detected noise component together with the spectrum of the base band component. Therefore, according to the digital modulation signal measuring device of the present invention, it is possible to easily recognize the quality of a noise component included in a digital modulation signal during actual transmission of the digital modulation signal, to guess the cause of generating the noise and to improve the transfer quality at easy.

20 Claims, 8 Drawing Sheets

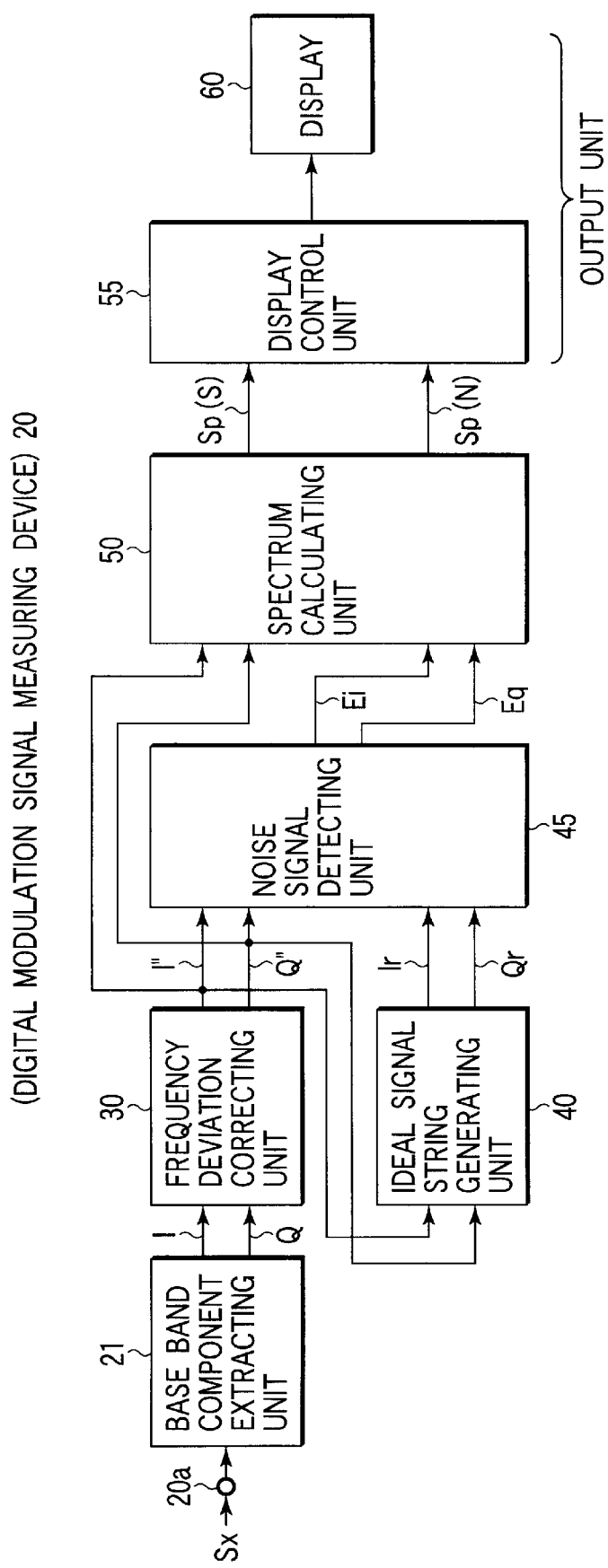
F I G. 1

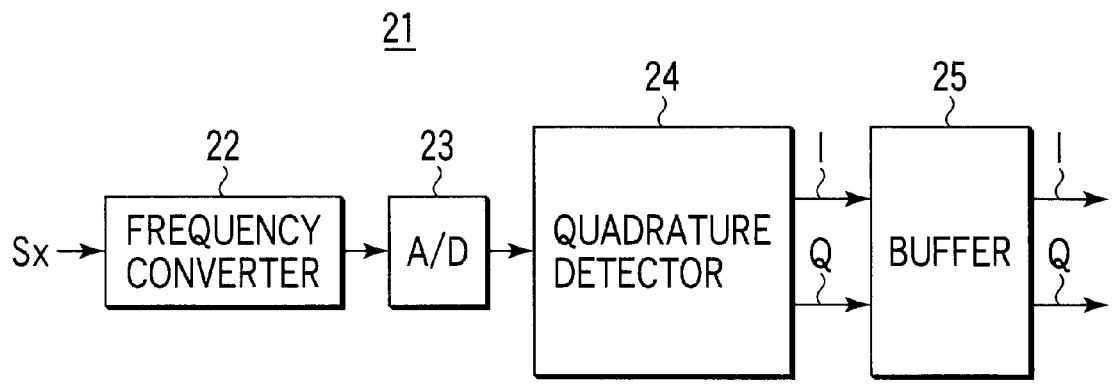
F I G. 2
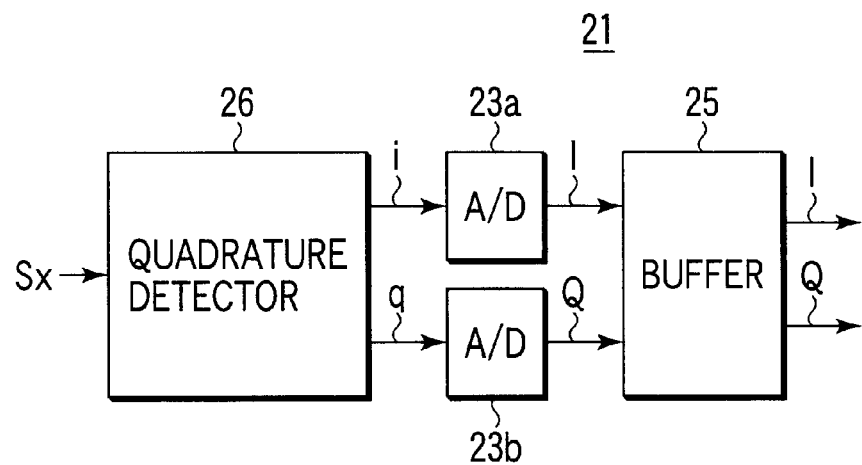
F I G. 3

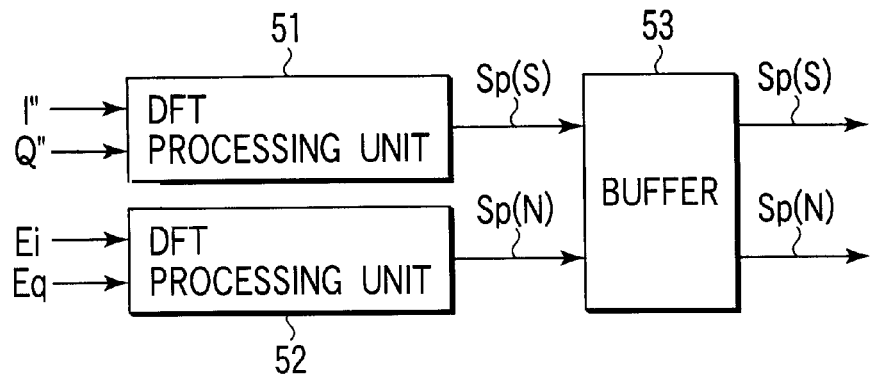
F I G. 11
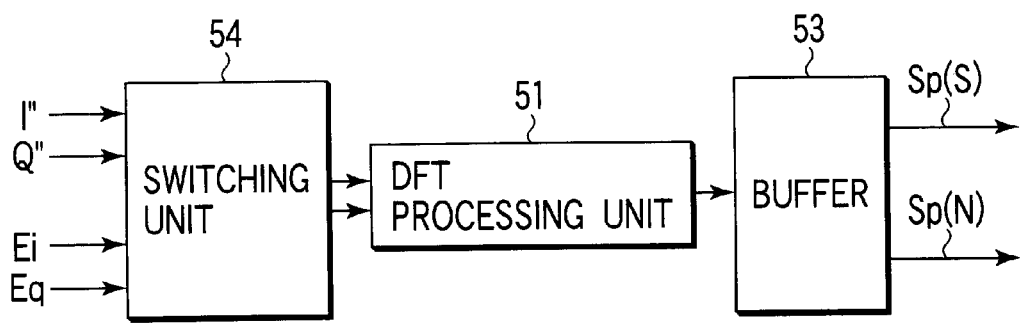
F I G. 12

US 6,754,260 B1

DIGITAL MODULATION SIGNAL MEASURING DEVICE AND METHOD CAPABLE OF EVALUATING SPECTRUM OF NOISE COMPONENT

This application is a U.S. National Phase Application under 35 USC 371 of International Application PCT/JP00/02954 filed May 9, 2000.

TECHNICAL FIELD

The present invention relates to a digital modulation signal measuring device and method, and more particularly to a digital modulation signal measuring device and method using a technique for evaluating the spectrum of a noise component included in a digital modulation signal, in a digital modulation signal measuring device for measuring a digital modulation signal.

BACKGROUND ART

Recently, a digital modulation signal is frequently used in mobile communication, broadcast, cable network communication, and the like.

This digital modulation signal is generated by quadrature-modulating a carrier signal by a modulation signal and transferred to a communication network.

When evaluating the quality of an apparatus and a channel using such a digital modulation signal, generally, code error rate is measured by a error measuring device, and transfer bandwidth or leakage of adjacent channels is measured by a spectrum analyzer.

For example, in a transfer channel of a bidirectional CATV network or the like, there is a problem of deteriorating the quality of the transfer channel caused by a noise generated by a household electrical appliance or leakage of a broadcast signal.

A periodical continuous noise such as CW causes more deterioration owing to code error even at the same level ratio, than a white noise having no self-correlation.

In case of laying a network, it is necessary to recognize the quality of the noise accurately and provide a stable service eliminating its cause.

Since a method of modulating the amplitude and the phase essentially is used for a digital modulation signal, it is often difficult to accurately recognize the quality of the noise component included in the digital modulation signal accurately.

When this digital modulation signal is measured by a spectrum analyzer, the occupation frequency band is all covered with signal spectrums Sp, as illustrated in FIG. 14.

Even if detecting an error by the error measurement, it is impossible to accurately recognize the quality of the noise included in the digital modulation signal and it is difficult to specify its cause.

In order to solve this problem, it may be possible to measure only the spectrum of a noise by a spectrum analyzer, using a single wave or in a non-signal state.

The above, however, cannot recognize the noise component of IM (intermodulation) which is generated in a relay or a receiver in a channel, caused by transfer of a digital modulation signal.

DISCLOSURE OF INVENTION

An object of the present invention is, in order to solve the above problem, to provide a digital modulation signal measuring device and method capable of easily recognizing the quality of a noise component included in a digital modulation signal.

One aspect of the present invention provides a digital modulation signal measuring device comprising:
 a base band component extracting unit (21) for extracting a base band component included in a digital modulation signal to be measured and outputting the same as a digital signal string (binary sequence);
 a frequency deviation correcting unit (30) for detecting carrier frequency deviation of the signal string of the base band component extracted by the base band component extracting unit and correcting the frequency deviation of the signal string of the base band component by the detected carrier frequency deviation;
 an ideal signal string generating unit (40) for generating a signal string of an ideal base band component from the signal string of the base band component corrected by the frequency deviation correcting unit;
 a noise signal detecting unit (45) for detecting a signal string of a noise component included in a digital modulation signal to be measured, by calculating difference between the signal string of the base band component corrected by the frequency deviation correcting unit and the signal string of the ideal base band component generated by the ideal signal string generating unit;
 a spectrum calculating unit (50) for calculating spectrums of the base band component and the noise component, by performing discrete Fourier transform on the signal string of the base band component corrected by the frequency deviation correcting unit and the signal string of the noise component detected by the noise signal detecting unit; and
 output units (55, 60) for outputting at least one of the spectrums of the base band component and the noise component calculated by the spectrum calculating unit.

Another aspect of the present invention provides a digital modulation signal measuring method comprising the steps of:
 extracting a base band component included in a digital modulation signal to be measure and outputting the same as a digital signal string;
 detecting carrier frequency deviation of a signal string of the extracted base band component and correcting the detected frequency deviation of the signal string of the base band component according to the detected carrier frequency deviation;
 generating a signal string of an ideal base band component from the signal string of the corrected base band component;
 detecting a signal string of a noise component included in the digital modulation signal to be measured, by calculating difference between the signal string of the corrected base band component and the signal string of the generated ideal base band component;
 calculating spectrums of the base band component and the noise component, by performing discrete Fourier transform on the signal string of the corrected base band component and the signal string of the detected noise component; and
 outputting at least one of the spectrums of the base band component and the noise component calculated in the above.

BRIEF DESCRIPTION OF DRAWINGS

FIG. 1 is a block diagram showing the whole structure of a digital modulation signal measuring device according to one embodiment of the present invention.

FIG. 2 is a block diagram showing the structure of an important portion of the digital modulation signal measuring device according to the embodiment as shown in FIG. 1.

FIG. 3 is a block diagram showing the structure of an important portion of the digital modulation signal measuring device according to the embodiment as shown in FIG.

FIG. 11 is a block diagram showing the structure of an important portion of the digital modulation signal measuring device according to the embodiment as shown in FIG. 1.

FIG. 12 is a block diagram showing the structure of an important portion of the digital modulation signal measuring device according to the embodiment as shown in FIG. 1.

BEST MODE FOR CARRYING OUT OF THE INVENTION

Figure 4:
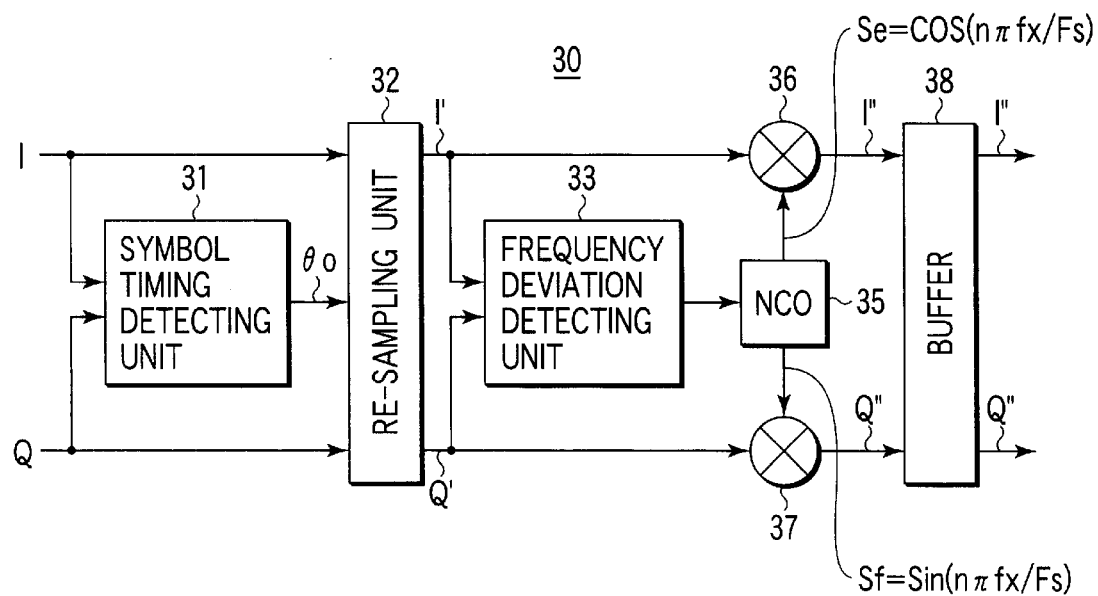
FIG. 4 is a block diagram showing the structure of an important portion of the digital modulation signal measuring device according to the embodiment as shown in FIG. 1.

Hereinafter, a digital modulation signal measuring device and method according to one embodiment of the present invention will be described with reference to the drawings.

FIG. 1 is a block diagram showing the whole structure of a digital modulation signal measuring device 20 to which the present invention is adopted.

In FIG. 1, a base band component extracting unit 21 has at least a quadrature detector and an A/D converter, and it extracts the base band component included in a digital modulation signal Sx to be measured which is input from an input terminal 20a and outputs the digital signal string.

In one case, this base band component extracting unit 21 extracts the base band component of the digital modulation signal Sx to be measured after digitizing the same signal (refer to FIG. 2), and in the other case, it extracts the base band component before digitizing the same (refer to FIG. 3).

The input digital modulation signal Sx is converted into an intermediate-frequency signal by a frequency converter 22, in the structure as shown in FIG. 2.

This intermediate-frequency signal is converted into a digital signal string by being sampled by the A/D converter 23.

From this signal string, signal strings of two base band components I and Q different in phase mutually at right angle are extracted by the quadrature detector 24 of digital type.

The thus extracted signal strings of the two base band components I and Q are supplied through a buffer 25.

The frequency converter 22 may be constituted in one stage or multistage.

In the structure as shown in FIG. 3, from the input digital modulation signal Sx, two base band components i and q different in phase mutually at right angle are extracted by the quadrature detector 26 of analog type.

The two base band components i and q are respectively sampled by the A/D converters 23a and 23b, and converted into the signal strings of the two digital base band components I and Q.

The thus converted signal strings of the two base band components I and Q are output through the buffer 25.

In this case, the frequency converter 22 of FIG. 2 may be provided in the front stage of the quadrature detector 26 of FIG. 3.

The quadrature detector is of known structure of converting the frequency of an input signal by a local signal having a different phase at right angle.

In the digital type quadrature detector 24, the local signal is output by a numeric generator. In the analog type quadrature detector 26, a local signal of analog is used.

The signal strings of the base band components I and Q obtained by the base band component extracting unit 21 are output to a frequency deviation correcting unit 30 as shown in FIG. 1.

This frequency deviation correcting unit 30 is to detect carrier frequency deviation of the base band components I and Q output from the base band component extracting unit 21 and to correct the base band components I and Q by this detected carrier frequency deviation.

FIG. 4 shows the concrete constitutional example of the frequency deviation correcting unit 30.

Namely, in FIG. 4, a symbol timing detecting unit 31 detects the symbol timing information (phase information) of the signal strings of the base band components I and Q obtained by the base band component extracting unit 21.

Figure 5:
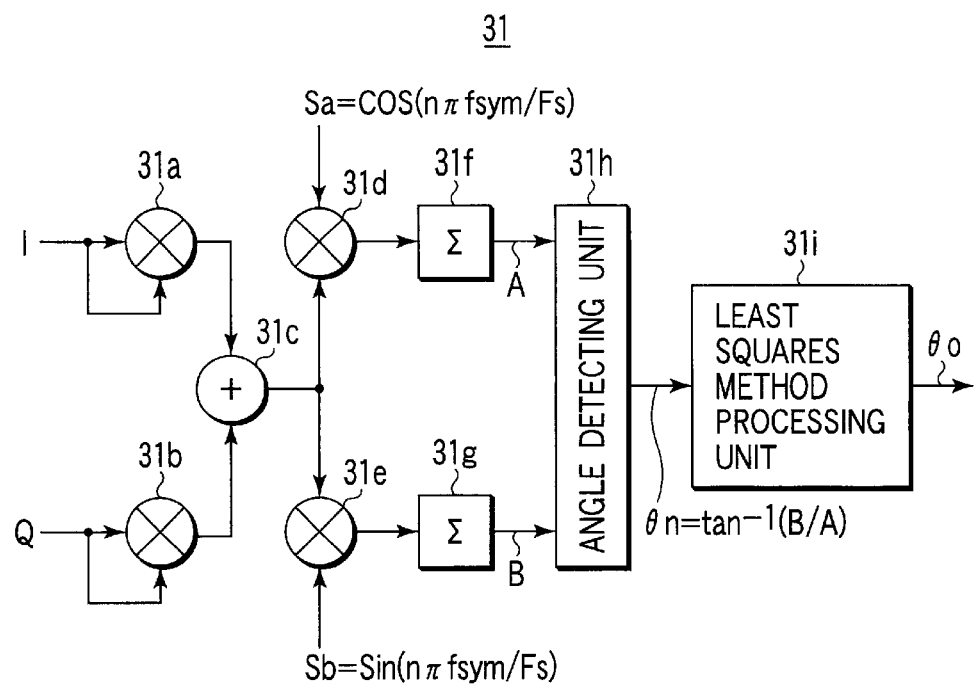
FIG. 5 is a block diagram showing the structure of an important portion of the digital modulation signal measuring device according to the embodiment as shown in FIG. 1.

More specifically, the symbol timing detecting unit 31 obtains each square of the signal strings of the base band components I and Q respectively by multiplier 31a and 31b, as illustrated in FIG. 5.

The square outputs (I2, Q2) are added to each other by an adder 31.

This addition result is respectively input to two mixers 31d and 31e.

Here, two local signals Sa=cos (nπf sym/Fs) and Sb=sin (nπf sym/Fs) different in phase mutually at right angel are input from a signal generator (numeric generator NCO) not illustrated, respectively to the two mixers 31d and 31e, where the frequency conversion will be performed on the above-mentioned addition result.

Integrators 31f and 31g perform interval integration on the respective frequency conversion outputs by the two mixers 31d and 31e.

An angle detecting unit 31h detects the angle information θ n=tan−1 (B/A) of the interval integration outputs A and B.

The symbol timing (phase) information is detected by a least squares method processing unit 31i performing the processing of the least squares method on the detected angle information θn.

Figure 6:
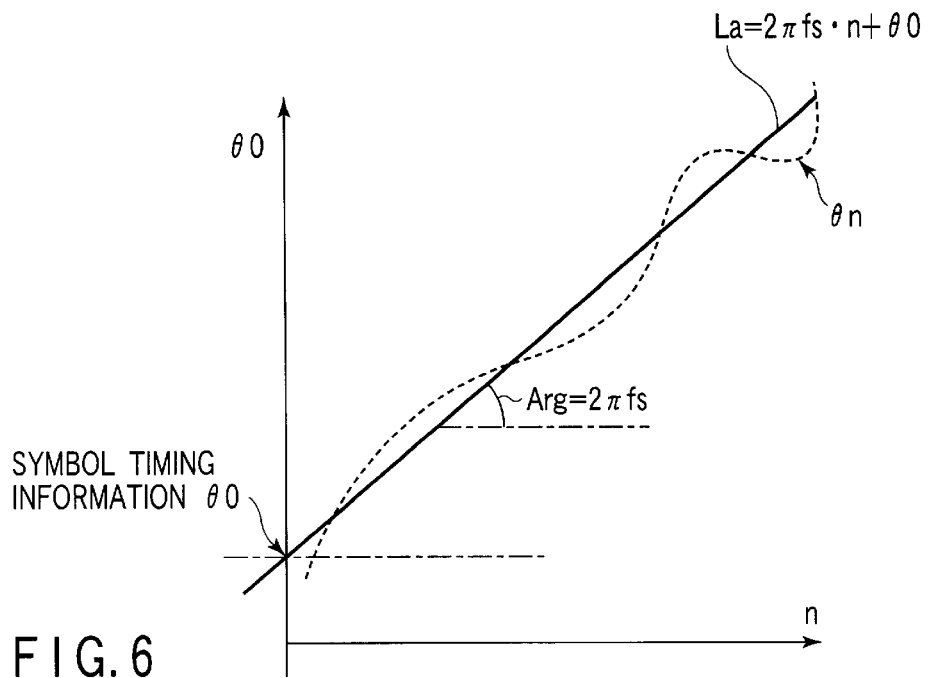
FIG. 6 is a view explaining the processing of an important portion of the digital modulation signal measuring device according to the embodiment as shown in FIG. 1.

In this case, the straight line information La (=2πfs·n+θ0) is taken out from the detected angle information θn as illustrated in FIG. 6, by the least squares method processing unit 31$i$.

The sectional information θ0 included in the straight line information La (=2πfs·n+θ0), that is, the symbol timing information (actually, the deviation information of the sampling timing in the base band component extracting unit 21) is taken out.

Returning to FIG. 4, a re-sampling unit 32 performs a re-sampling on the signal strings of the base band components I and Q, based on the symbol timing information detected by the above-mentioned symbol timing detecting unit 31, thereby to correct the deviation of the sampling timing.

The frequency deviation detecting unit 33 detects the frequency deviation of the signal strings of the base band components I' and Q' sampled again by the re-sampling unit 32.

The frequency deviation is to be caused by the deviation of the carrier frequency of an input signal.

Figure 7:
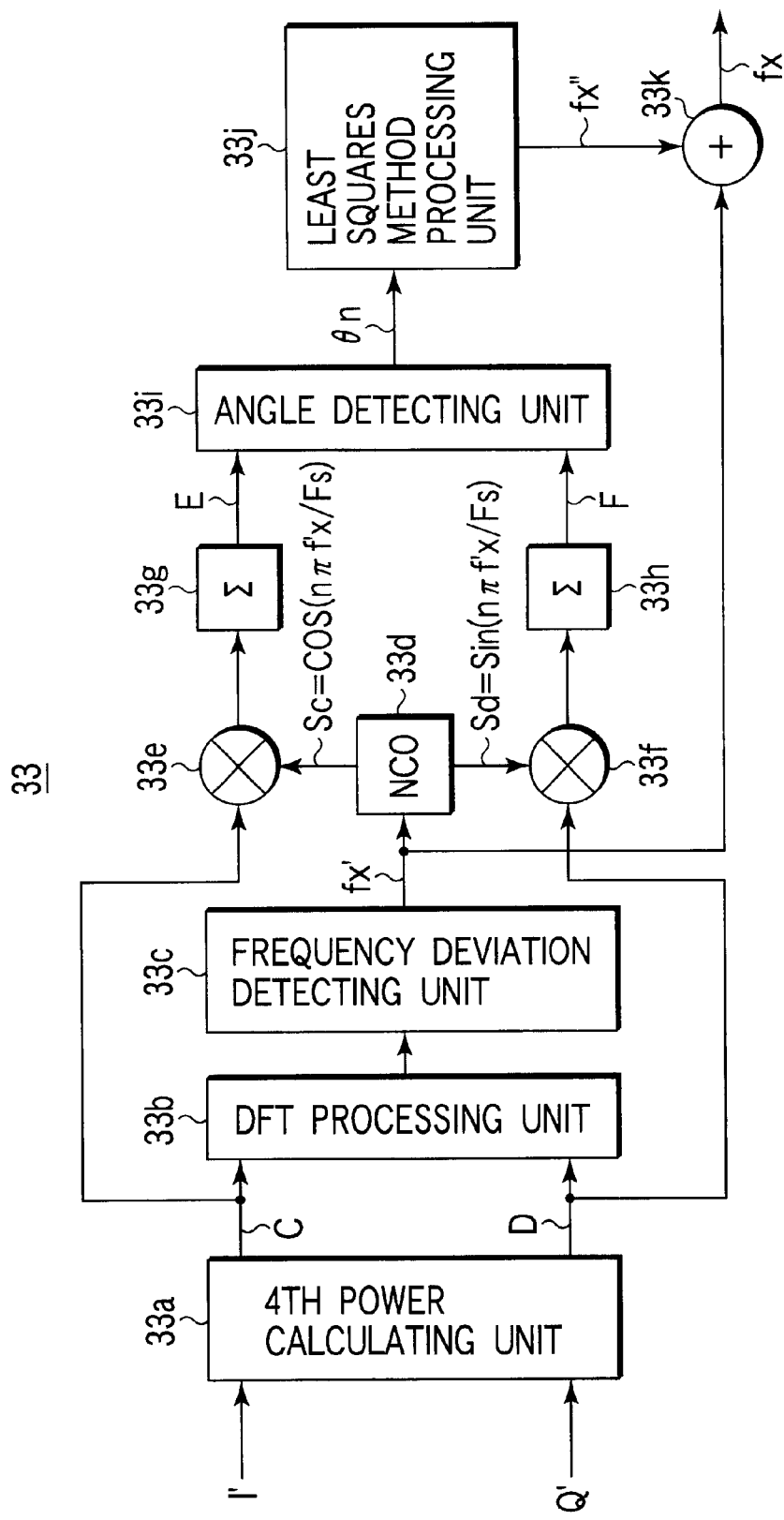
FIG. 7 is a block diagram showing the structure of an important portion of the digital modulation signal measuring device according to the embodiment as shown in FIG. 1.

FIG. 7 shows the concrete structure of the frequency deviation detecting unit 33.

Namely, in FIG. 7, the $4^{th}$ power of the base band component (I'+jQ') is calculated by a $4^{th}$ power calculating unit 33$a$.

The quadrature components C and D of the calculation result (C+jD) are processed through DFT (discrete Fourier transform) by a DFT processing unit 33$b$.

Since the component of four times of the deviation fx' of the carrier frequency appears as the maximum value as the result of the DFT processing, one fourth of this maximum frequency is detected as the actual frequency deviation fx' by a frequency deviation detecting unit 33$c$.

Further, based on the frequency deviation information fx', the frequency conversion is performed on the quadrature components C and D by the mixers 33$e$ and 33$f$.

More specifically, based on the frequency deviation information fx', the two local signals Sc=cos (nπfx'/Fs) and Sd=sin (nπfx'/Fs) different in phase mutually at right angle are output from the signal generator (NCO) 33$d$ to the mixers 33$e$ and 33$f$, thereby performing the frequency conversion on the quadrature components C and D of $4^{th}$ power.

The frequency conversion outputs are interval-integrated by integrators 33$g$ and 33$h$, and the angle information θn=tan−(F/E) of the interval integration outputs E and F is calculated by the angle calculating unit 33$i$.

The least squares method processing is performed on the calculated angle information θn by the least squares method processing unit 33$j$, thereby detecting the frequency smallest deviation fx".

Figure 8:
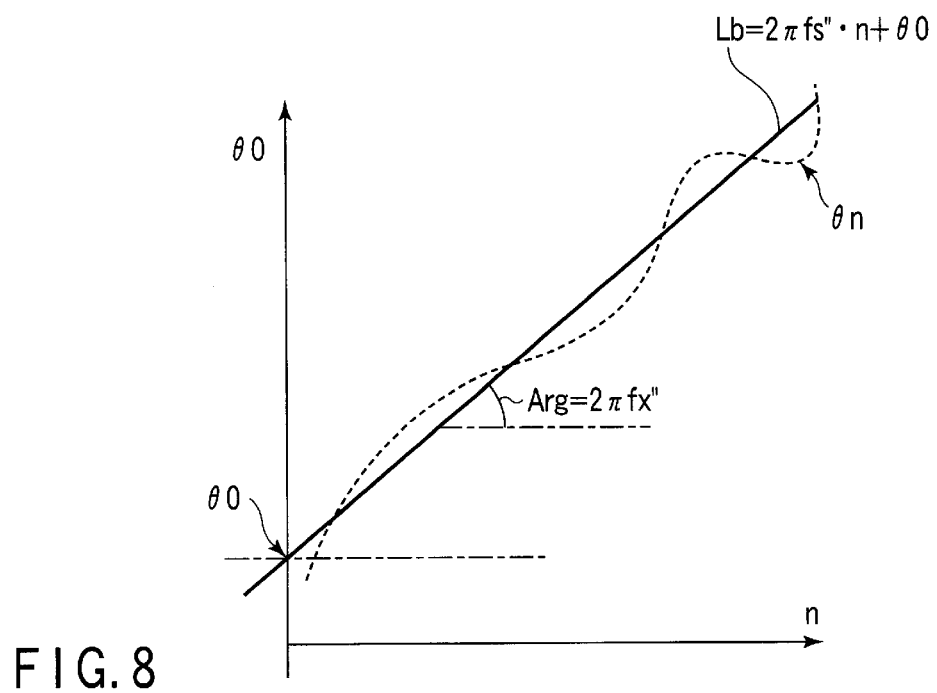
FIG. 8 is a view for explaining the processing of an important portion of the digital modulation signal measuring device according to the embodiment as shown in FIG. 1.

In this case, the straight line Lb (=2πfx"·n+θ0) is taken out from the detected angle information θn as illustrated in FIG. 8, in the least squares method processing unit 33$j$.

The frequency smallest deviation fx" is obtained from the gradient of the straight line information Lb (=2πfx"·n+θ0).

The frequency deviation fx' detected by the frequency deviation detecting unit 33$c$ is added to this frequency smallest deviation fx" by an adder 33$k$, thereby detecting and outputting the addition result fx as the frequency deviation information.

Based on thus detected frequency deviation information, the frequency conversion processing is performed on the base band components I' and Q'.

More specifically, as illustrated in FIG. 4, upon receipt of the frequency deviation information detected by the frequency deviation detecting unit 33, the signal generator (NCO) 35 outputs the two local signals Se=cos (nπfx/Fs) and Sf=sin (nπfx/Fs) different in phase mutually at right angle to the mixers 36 and 37.

The mixers 36 and 37 perform the frequency conversion on the base band components I' and Q' sampled again by the re-sampling unit 32.

The signal strings of the thus frequency converted base band components I" and Q" are respectively output through the buffer 38.

Thus, the base band components I" and Q" whose frequency deviation is respectively corrected by the frequency deviation correcting unit 30 are output to an ideal signal string generating unit 40 as illustrated in FIG. 1.

The ideal signal string generating unit 40 generates a signal string of ideal base band component including none of deviation such as noise, frequency deviation, and the like, from the signal strings of the base band components I" and Q" corrected by the frequency deviation correcting unit 30.

Figure 9:
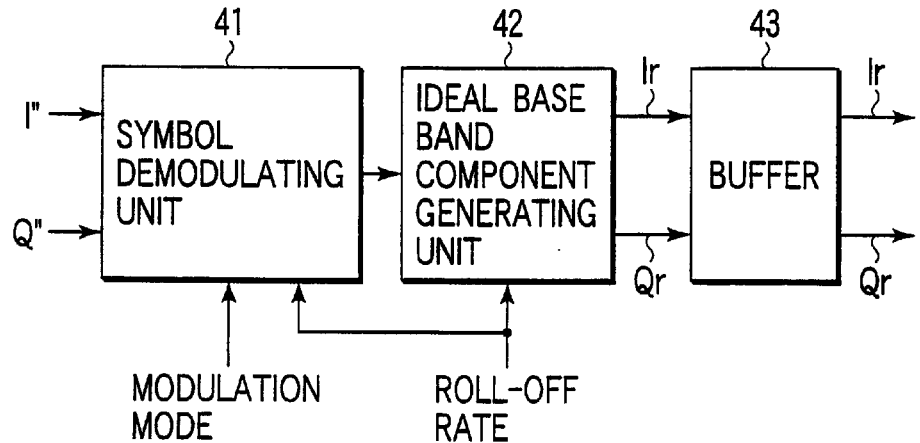
FIG. 9 is a block diagram showing the structure of an important portion of the digital modulation signal measuring device according to the embodiment as shown in FIG. 1.

The ideal signal string generating unit 40 demodulates the symbol information from the signal strings of the base band components I', and Q" by a symbol demodulating unit 41, as illustrated in FIG. 9.

The modulation mode information and the roll-off rate on the digital modulation signal to be measured are input to the symbol demodulating unit 41, and constellation mapping used for the demodulation (position on the IQ plane decided by the phase and the amplitude) is defined.

The symbol demodulating unit 41 matches the signal strings of the base band components I" and Q" with this constellation mapping, thereby demodulating them.

An ideal base band component generating unit 42 generates the signal strings of the ideal base band components Ir and Qr, based on the symbol information demodulated by the symbol demodulating unit 41, with the roll-off rate of the digital demodulation signal to be measured used as the parameter.

The signal strings of the ideal base band components Ir and Qr are respectively output through the buffer 43.

The signal strings of the ideal base band components Ir and Qr generated by the ideal signal string generating unit 40 are input to a noise signal detecting unit 45 together with the signal-strings of the base band components I" and Q" having the frequency deviation corrected by the frequency deviation correcting unit 30, as illustrated in FIG. 1.

Figure 10:
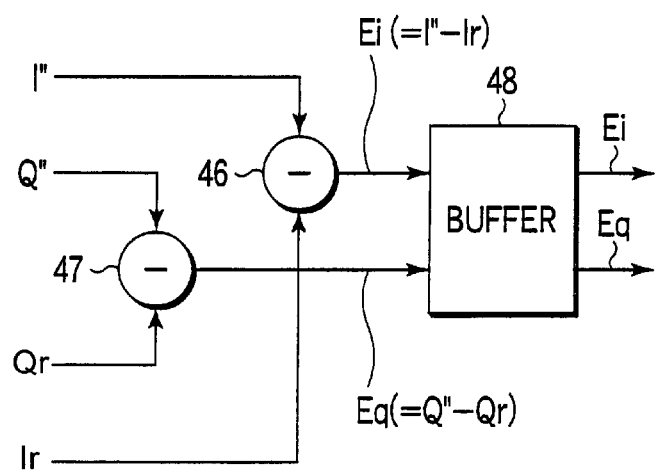
FIG. 10 is a block diagram showing the structure of an important portion of the digital modulation signal measuring device according to the embodiment as shown in FIG. 1.

In the noise signal detecting unit 45, the difference Ei between the base band component I" and each ideal base band component Ir is obtained by a subtracter 46, as illustrated in FIG. 10.

In the noise signal detecting unit 45, the difference Eq between the base band component Q" and the ideal base band component Qr is obtained by a subtracter 47.

The signal strings as the result of the subtraction results Ei and Eq of the respective subtracters 46 and 47 are obtained through a buffer 48 as the signal strings of the noise components.

Returning to FIG. 1, the DFT processing is performed on the signal strings of the base band components I" and Q" corrected by the frequency deviation correcting unit 30 and the signal strings of the noise components Ei and Eq detected by the noise signal detecting unit 45, in the spectrum calculating unit 50.

Namely, as illustrated in FIG. 11, after having been calculated, the spectrum Sp (S) of the base band components I" and Q" and the spectrum Sp (N) of the noise component are respectively output through the buffer 53 by the DFT processing units 51 and 52.

The DFT processing on the signal strings of the base band components I" and Q" and the DFT processing on the signal strings of the noise components Ei and Eq are not always performed by the two independent DFT processing units 51 and 52 in parallel as illustrated in FIG. 11.

Otherwise, in this DFT processing, a switching unit 54 for switching the object to be processed may be provided in the front stage of the DFT processing unit 51, as illustrated in FIG. 12.

Returning to FIG. 1, a display control unit 55 is to form a display 60 capable of displaying images as well as an output (display) unit according to the embodiment.

Figure 13:
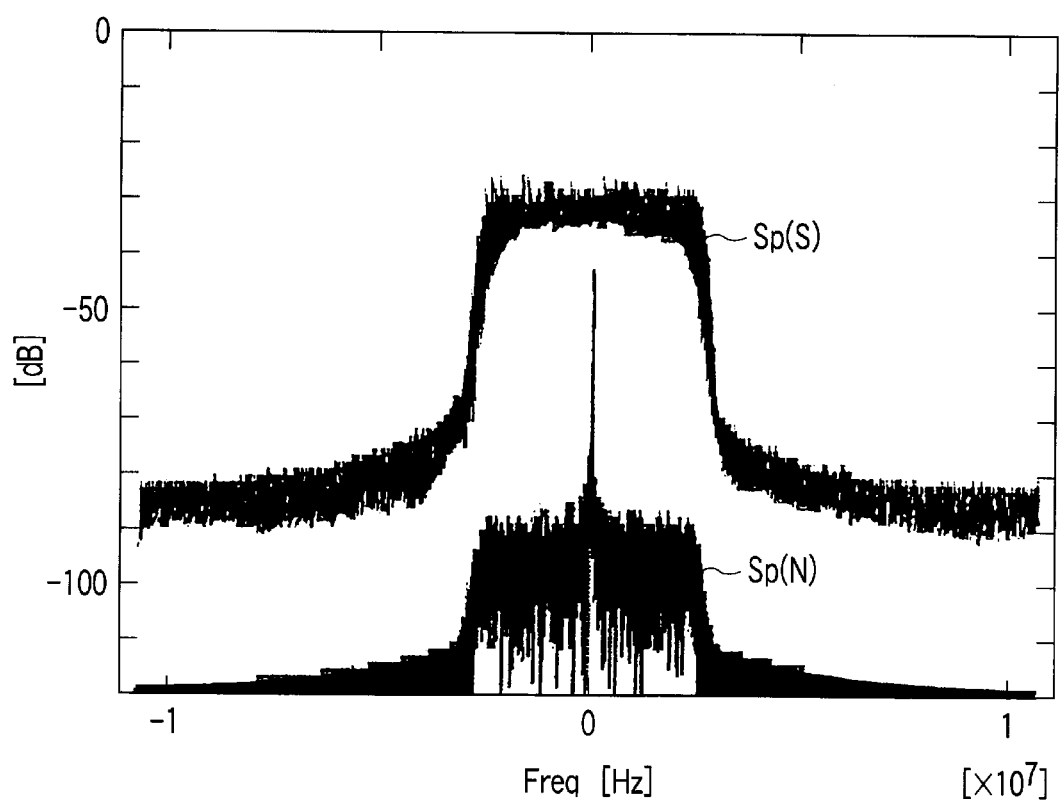
FIG. 13 is a view showing the display example of the measurement result of the digital modulation signal measuring device according to the embodiment as shown in FIG. 1.
Figure 14:
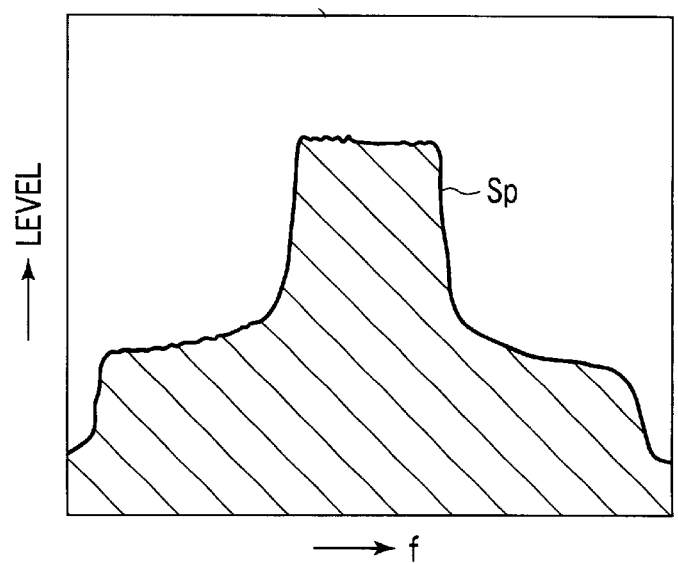
FIG. 14 is a view showing the display example of the measurement result by the conventional device.

Namely, as illustrated in FIG. 1, the spectrum Sp (S) of the base band component calculated by the spectrum calculating unit 50 and the spectrum Sp (N) of the noise component are displayed on the same coordinate surface of a screen of the display 60, in a distinguishable way, for example, as illustrated in FIG. 13.

Since this display enables the synchronous observation of the spectrum Sp (S) of the base band component and the spectrum Sp of the noise component included in the digital modulation signal, it is possible to easily recognize whether the noise component includes only the wide band white nose or it includes the periodical continuous noise such as CW.

Since the cause of generating the noise can be easily assumed from the frequency and the level of the periodical continuous noise, the quality of transmission can be easily improved.

In FIG. 13, the lower portion of the spectrum Sp (S) of the base band component is erased (or thinned), so as to make the spectrum Sp (N) of the noise component distinguishable.

Then, the spectrum Sp (S) of the base band component may be displayed in a predetermined color, with the spectrum Sp (N) of the noise component overlaying thereon in a different color, or the whole spectrum Sp (S) of the base band component may be displayed in light color, while the spectrum Sp (N) of the noise component may be displayed in dark color.

Further, instead of displaying the spectrums of the base band component and the noise component on the same coordinate surface, the spectrums of the base band component and the noise component may be separately displayed on the different coordinate surface, or one spectrum of them may be selectively displayed on one coordinate surface.

As mentioned above, the digital modulation signal measuring device of the present invention is designed to generate the signal string of an ideal base band component after correcting the frequency deviation of the base band component included in a digital modulation signal to be measured, detect the noise component included in the digital modulation signal based on this ideal base band component, and output (display) the spectrum of the detected noise component together with the spectrum of the base band component.

Therefore, according to the digital modulation signal measuring device and method of the present invention, it is possible to easily recognize the quality of a noise component included in a digital modulation signal during actual transmission of the digital modulation signal, guess the cause of generating the noise and improve the transfer quality at easy.

As set forth hereinbefore, in order to solve the above-mentioned problems in the conventional art, the present invention can provide a digital modulation signal measuring device and method capable of easily recognizing the quality of a noise component included in a digital modulation signal.

We claim:

1. A digital modulation signal measuring device comprising:

a base band component extracting unit for extracting a base band component included in a digital modulation signal to be measured, and outputting the base band component as a digital signal string;

a frequency deviation correcting unit for detecting carrier frequency deviation of the signal string of the base band component extracted by said base band component extracting unit, and correcting a frequency deviation of the signal string of the base band component according to the detected carrier frequency deviation;

an ideal signal string generating unit for generating a signal string of an ideal base band component from the signal string of the base band component corrected by said frequency deviation correcting unit;

a noise signal detecting unit for detecting a signal string of a noise component included in the digital modulation signal to be measured, by calculating difference between the signal string of the base band component corrected by said frequency deviation correcting unit and the signal string of the ideal base band component generated by said ideal signal string generating unit;

a spectrum calculating unit for calculating spectrums of the base band component and the noise component, by performing discrete Fourier transform on the signal string of the base band component corrected by said frequency deviation correcting unit and the signal string of the noise component detected by said noise signal detecting unit; and an output unit for outputting at least one of the spectrums of the base band component and the noise component calculated by said spectrum calculating unit.

2. The digital modulation signal measuring device according to claim 1, wherein said base band component extracting unit includes one of (i) at least a digital quadrature detector and one A/D converter, and (ii) at least an analog quadrature detector and two A/D converters, and wherein the base bane component included in the digital modulation signal to be measured which is input from an input terminal is extracted to output the digital signal string.

3. The digital modulation signal measuring device according to claim 2, wherein said base band component extracting unit comprises said digital quadrature detector and said one A/D converter, wherein said base band component extracting unit further includes a frequency converter for converting the digital modulation signal input from the input terminal into an intermediate frequency signal, wherein the intermediate frequency signal is converted into said digital signal string by sampling the intermediate frequency signal by said one A/D converter, and wherein signal strings of two base band components I and Q different in phase mutually at a right angle are extracted from said digital signal string, by said digital quadrature detector.

4. The digital modulation signal measuring device according to claim 2, wherein said base band component extracting unit includes said analog quadrature detector and said two A/D converters, wherein said analog quadrature detector extracts two base band components i and q different in phase mutually at a right angle, from the digital modulation signal input from the input terminal, and wherein the two base band components i and q are converted into two digital base band components I and Q by sampling the the two base band components i and q by said two A/D converters respectively.

5. The digital modulation signal measuring device according to claim 4, wherein said frequency deviation correcting unit includes:

a symbol timing detecting unit for detecting symbol timing information of signal strings of the digital base band components I and Q obtained by said base band component extracting unit;

a re-sampling unit for correcting deviation of sampling timing by sampling again the signal strings of the digital base band components I and Q, based on the symbol timing information detected by said symbol timing detecting unit, thereby obtaining re-sampled digital base band components I' and Q';

a frequency deviation detecting unit for detecting frequency deviation of signal strings of the re-sampled digital base band components I' and Q' sampled again by said re-sampling unit;

a signal generator for, upon receipt of the frequency deviation information detected by said frequency deviation detecting unit, generating two local signals Se and Sf different in phase mutually at a right angle; and two mixers for performing frequency conversion on the re-sampled digital base band components I' and Q' sampled again by said re-sampling unit, through the two local signals Se and Sf supplied from said signal generator, thereby obtaining frequency converted base components I" and Q", wherein signal strings of the base band components I" and Q" frequency-converted by said two mixers are output, respectively.

6. The digital modulation signal measuring device according to claim 5, wherein said symbol timing detecting unit includes:

two multipliers for obtaining each square of the signal strings of the digital base band components I and Q;

an adder for adding respective square outputs from said two multipliers to each other;

two mixers for performing individual frequency conversion on an addition result of said adder, through two local different in phase mutually at a right angle;

two integrators for performing individual interval integration on respective frequency-converted outputs of said two mixers;

an angle detecting unit for detecting angle information θn=tan−1 (B/A) of interval-integrated outputs A and B of said two integrators; and a least squares method processing unit for performing processing by a least squares method on the angle information θn detected by said angle detecting unit, wherein said least squares method processing unit takes out straight line information La from the detected angle information θn and takes out sectional information θ0 included in the straight line information La as the symbol timing information.

7. The digital modulation signal measuring device according to claim 5, wherein said frequency deviation detecting unit includes:

a $4^{th}$ power calculating unit for calculating a $4^{th}$ power of the base band component (I'+jQ') in order to detect the frequency deviation of the signal strings of the re-sampled digital base band components I' and Q' sampled again by said re-sampling unit;

a discrete Fourier transform processing unit for processing quadrature components C and D of a calculation result (C+jD) of said $4^{th}$ power calculating unit through discrete Fourier transform;

a frequency deviation detecting unit for regarding one fourth of a maximum frequency that is a result of the discrete Fourier transform processing as an actual frequency deviation fx';

a signal generator for generating two local signals Sc and Sd different in phase mutually at a right angle, based on the frequency deviation information fx' detected by said frequency deviation detecting unit;

two mixers for performing frequency conversion on the quadrature components C and D of the calculation result (C+jD) of said $4^{th}$ power calculating unit, through the two local signals Sc and Sd supplied from said signal generator;

two integrators for performing individual interval integration on respective frequency converted outputs from said two mixers;

an angle calculating unit for calculating angle information θn=tan−1 (F/E) of respective interval-integrated outputs E and F from said two integrators;

a least squares method processing unit for detecting a smallest frequency deviation fx", by performing processing by a least squares method on the angle information θn calculated by said angle calculating unit; and an adding unit for adding the frequency deviation fx' detected by said frequency deviation detecting unit to the smallest frequency deviation fx" detected by said least squares method processing unit, thereby detecting addition result fx as the frequency deviation information, and outputting the addition result fx, wherein said least squares method processing unit takes out straight line information Lb from the angle information θn calculated by said angle calculating unit and obtains the smallest frequency deviation fx" from a gradient of the straight line information Lb.

8. The digital modulation signal measuring device according to claim 5, wherein said ideal signal string generating unit includes:

a symbol demodulating unit for demodulating symbol information from the signal strings of the frequency converted base band components I" and Q" output by said frequency deviation correcting unit; and an ideal base band component generating unit for generating signal strings of ideal base band components Ir and Qr, based on the symbol information demodulated by said symbol demodulating unit, wherein roll-off rate of the digital modulation signal to be measured is used as a parameter to generate the signal strings of the ideal base band components Ir an Or, wherein said symbol demodulating unit receives the roll-off rate and modulation mode information of the digital modulation signal to be measured, so as to define constellation mapping for use in demodulation, and wherein said symbol demodulating unit demodulates the signal strings of the frequency converted base band component s I" and Q" by matching the signal strings of the ideal base components Ir and Qr to the constellation mapping.

9. The digital modulation signal measuring device according to claim 8, wherein said noise signal detecting unit includes:
- a subtracter for requiring difference Ei between the base frequency converted band component I" output by said frequency deviation correcting unit and the ideal base band component Ir generated by said ideal base band component generating unit; and
- a subtracter for requiring difference Eq between the frequency converted base band component Q" output by said frequency deviation correcting unit and the ideal base band component Qr generated by said ideal base band component generating unit, and
- wherein signal strings of the subtraction results Ei and Eq of said subtracters are respectively supplied as the signal strings of the noise components included in the digital modulation signal to be measured.

10. The digital modulation signal measuring device according to claim 9,
- wherein in order to perform discrete Fourier transform processing on the signal strings of the frequency converted base band components I" and Q" output by said frequency deviation correcting unit and the signal strings of the noise components Ei and Eq supplied by said noise signal detecting unit, said spectrum calculating unit includes:
  - a first discrete Fourier transform processing unit for calculating spectrum Sp (S) of the frequency converted base band components I" and Q"; and
  - a second discrete Fourier transform processing unit for calculating spectrum Sp (N) of the noise components Ei and Eq.

11. A digital modulation signal measuring device according to claim 9,
- wherein in order to perform discrete Fourier transform processing on the signal strings of the frequency converted base band components I" and Q" output by said frequency deviation correcting unit and the signal strings of the noise components Ei and Eq supplied by said noise signal detecting unit, said spectrum calculating unit includes:
  - a switching unit for switching an object to be processed; and
  - a single discrete Fourier transform processing unit for selectively calculating spectrum Sp (S) of the frequency converted base band components I' and Q" and spectrum Sp (N) of the noise components Ei and Eq, according to switching by said switching unit.

12. A digital modulation signal measuring device according to claim 1, wherein said output unit includes a display control unit and a display capable of displaying an image, and
- wherein a spectrum Sp (S) of the base band component and a spectrum Sp (N) of the noise component included the spectrums calculated by said spectrum calculating unit are displayed on a same coordinate surface of a screen of said display, in a distinguishable way, based on a control by said display control unit.

13. A digital modulation signal measuring device according to claim 12, wherein said display control unit erases or thins a lower portion of the spectrum Sp (S) of the base band component sodas to make the spectrum Sp (N) of the noise component distinguishable, on the same coordinate surface of the screen of said display.

14. A digital modulation signal measuring method comprising:
- extracting a base band component included in a digital modulation signal to be measured, and outputting the base band component as a digital signal string;
- detecting carrier frequency deviation of a signal string of the extracted base band component, and correcting a frequency deviation of the signal string of the base band component according to the detected carrier frequency deviation;
- generating a signal string of an ideal base band component from the signal string of the corrected base band component;
- detecting a signal string of a noise component included in the digital modulation signal to be measured, by calculating difference between the signal string of the corrected base band component and the signal string of the generated ideal base band component;
- calculating spectrums of the base band component and the noise component, by performing discrete Fourier transform on the signal string of the corrected base band component and the signal string of the detected noise component; and
- outputting at least one of the calculated spectrums of the base band component and the noise component.

15. A digital modulation signal measuring method according to claim 14, wherein a spectrum Sp (S) of the base band component and a spectrum Sp (N) of the noise component are included the calculated spectrums, and are displayed on a same coordinate surface of a screen of a display in a distinguishable way.

16. A digital modulation signal measuring method according to claim 14, wherein a spectrum Sp (S) of the base band component and a spectrum Sp (N) of the noise component are included the calculated spectrums, and are displayed on a same surface of a screen of a display, and
- wherein the spectrum Sp (N) of the noise component is made distinguishable by erasing or thinning a lower portion of the spectrum Sp (S) of the base band component.

17. A digital modulation signal measuring method according to claim 14, wherein a spectrum Sp (S) of the base band component and a spectrum Sp (N) of the noise component are included the calculated spectrums, and are displayed on a same coordinate surface of a screen of a display, and
- wherein the spectrum Sp (N) of the noise component is made distinguishable [[,]] by displaying the spectrum Sp (S) of the base band component in a predetermined color, with the spectrum Sp (N) of the noise component overlaying thereon in a different color.

18. A digital modulation signal measuring method according to claim 14, wherein a spectrum Sp (S) of the base band component and a spectrum Sp (N) of the noise component are included the calculated spectrums, and are displayed on a same coordinate surface of a screen of a display, and
- wherein the spectrum Sp (N) of the noise component is made distinguishable by displaying the whole spectrum Sp (S) of the base band component in a light color, while displaying the spectrum Sp (N) of the noise component in a dark color.

19. A digital modulation signal measuring method according to claim 14, wherein a spectrum Sp (S) of the base band component and a spectrum Sp (N) of the noise component are included the calculated spectrums, and are displayed on a separate coordinate surface of a screen of a display, so as to make the spectrum Sp (N) of the noise component distinguishable.

20. A digital modulation signal measuring method according to claim 14, wherein a spectrum Sp (S) of the base band component and a spectrum, and are distinguishably displayed by selectively displaying one of the spectrums on one coordinate surface of screen of a display.

* * * * *